United States Patent
Garrett

[15] 3,662,255
[45] May 9, 1972

[54] APPARATUS FOR LOCATING CONCEALED OR BURIED METAL BODIES AND A STABLE INDUCTOR USABLE IN SUCH DETECTORS

[72] Inventor: Charles L. Garrett, 1201 Ravina Drive, Garland, Tex. 75040

[22] Filed: Apr. 13, 1970

[21] Appl. No.: 27,575

[52] U.S. Cl. ................................................................. 324/3
[51] Int. Cl. .............................................................. G01v 3/10
[58] Field of Search ............................. 324/3, 6; 336/195

[56] References Cited

UNITED STATES PATENTS

| | | | |
|---|---|---|---|
| 3,519,919 | 7/1970 | Rance | 324/3 |
| 3,005,965 | 10/1961 | Wertanen | 336/195 X |
| 3,549,985 | 12/1970 | Penland | 324/3 |
| 3,467,855 | 9/1969 | Rance | 324/3 |
| 3,094,658 | 6/1963 | Bravenec et al. | 324/6 |
| 3,197,723 | 7/1965 | Dortort | 336/195 |
| 2,564,881 | 8/1951 | Cronshey et al. | 336/195 X |

*Primary Examiner*—Gerard R. Strecker
*Attorney*—Walter J. Jagmin

[57] ABSTRACT

A metal detector for locating metal bodies buried in the ground or embedded in other structures having a probe assembly which is movable parallel to the surface of the earth or such structure and whose inductance varies as the inductor assembly is moved into the proximity of such concealed object, the detector providing an output signal whose frequency varies in accordance with the inductance of the probe assembly, wherein the probe assembly includes large diameter and small diameter inductor assemblies selectively connectible in a frequency determining circuit of an oscillator and wherein the signal produced by the detector may be indicated visually by means of a meter, audibly by a speaker to which the output of the detector is transmitted, or by neon bulbs mounted on the inductor assemblies which light up with a frequency which varies in accordance with the frequency of the output of the detector.

A stable inductor assembly usable in detectors of the type described and having an inductor coil formed of a coaxial cable whose inner conductor is connected in the frequency determining circuit of an oscillator and whose outer coaxial conductor is grounded to form a partial Faraday shield between the inner conductor and a Faraday shield mounted exteriorly of the coil.

12 Claims, 9 Drawing Figures

PATENTED MAY 9 1972 3,662,255

INVENTOR.
Charles L. Garrett
BY
Walter J. Jay
ATTORNEY

INVENTOR.
Charles L. Garrett

APPARATUS FOR LOCATING CONCEALED OR BURIED METAL BODIES AND A STABLE INDUCTOR USABLE IN SUCH DETECTORS

This invention relates to devices for locating metal objects buried in the ground or concealed in other structures and to a stable characteristic inductor assembly.

Conventional devices for detecting or locating concealed metal objects as, for example, buried in the ground or embedded in a wall or other building structure, have a stable reference frequency oscillator and a second oscillator the frequency of whose output varies with the effective inductance of an inductor assembly having a ring shaped coil formed of several turns of on insulated conductor and a Faraday shield mounted thereon, the coil being connected in the frequency determining circuit, such as an LC tank circuit, of the second oscillator. The frequency of the output of the second oscillator is compared with the frequency of the output of the reference oscillator to provide the detector output signal. The Faraday type electrostatic shield is provided to prevent stray or ground capacitances from varying the effective inductance of the coil and thus producing various unwanted changes in the frequency of the output of the second oscillator. It is found that the effective inductance of such inductor assembly varies considerably with variations in temperature at the location of the inductor assembly, probably due to the fact that a capacitance exists between the Faraday shield and the inductor coil and that such capacitance varies probably because variations in temperature cause the Faraday shield to move closer or farther away from the coil turns, the fact that the diameter of the coil may change or the fact that the spacing between the turns of the coil may change. Thus the output of the detector will vary as such inductor assembly is moved, for example, from shadow into the sunlight or vice versa. This Faraday shield, however, is necessary for the proper operation of the detector. It is desirable therefore that a detector be provide which will operate properly even though its inductor assembly is subject to considerable variations in temperature during use.

It is also found that in some applications, for example, in the use of the detector to locate objects buried in the ground below a body of water, the use of an earphone speaker or a meter to indicate the output of the speaker is impractical due to extraneous noise in the first case and the necessity for closely observing the ground at the location of the inductor assembly in the second case.

It is an object of this invention to provide a new and improved detector for locating concealed objects having an inductor assembly which is movable adjacent the surface of the ground or a building structure and which will also provide a signal when the probe assembly is moved to the proximity of an object buried in the ground below the surface or embedded in such structure.

Still another object is to provide a detector of the type described whose inductor assembly includes a ring shaped inductor coil having a Faraday shield disposed about its bottom portion for shielding the inductor coil from stray and ground capacitances which would vary the effective inductance of the inductor assembly and whose effective inductance will not vary appreciably with changes in temperature of the inductor assembly.

Another object is to provide a detector of the type described having a first reference oscillator which provides a stable reference frequency output and a second oscillator the frequency of whose output varies in accordance with the effective inductance of an inductor assembly which in turn varies with the proximity of metal objects thereto.

A further object is to provide a detector of the type described wherein the inductor assembly is connected in the frequency determining circuit of the second oscillator.

A still further object is to provide a detector of the type described wherein the effective inductance of the inductor assembly does not vary with changes of temperature.

A further object is to provide a detector having a visual means for indicating the output.

Still another object is to provide a detector of the type described wherein the output indicating means comprises a plurality of neon bulbs which are mounted on a circular inductor assembly.

An important object of the invention is to provide a stable characteristic inductor assembly whose effective inductance does not vary with variations in temperature.

Another object is to provide an inductor assembly having a circular coil formed of a plurality of turns of a coaxial cable comprising a central or inner conductor, a cylindrical or outer conductor coaxial with and spaced and insulated from the inner conductor and an insulating sheath exteriorly of the outer conductor; and a Faraday shield disposed about the coil.

Still another object is to provide an inductor assembly of the type described wherein the Faraday shield and the outer conductor do not form closed conductive paths and the shield, the outer conductor and one end of the inner conductor are all connectible to ground to prevent stray or ground capacitances from changing the effective inductance of the inductor assembly.

Additional objects and advantages will be readily apparent from the reading of the following description of a device constructed in accordance with the invention, and reference to the accompanying drawings thereof, wherein.

Figure 1:
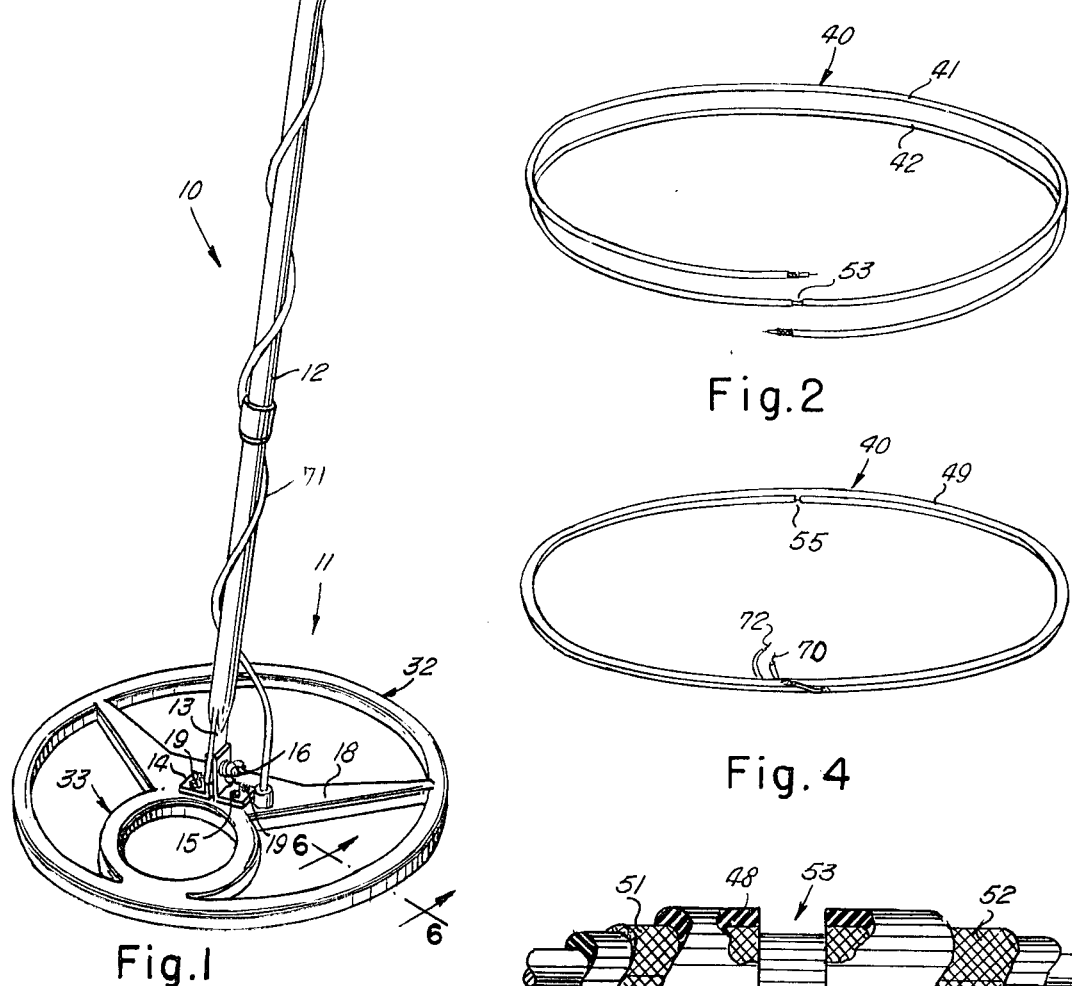
FIG. 1 is a perspective view of a detector embodying the invention.
Figure 3:
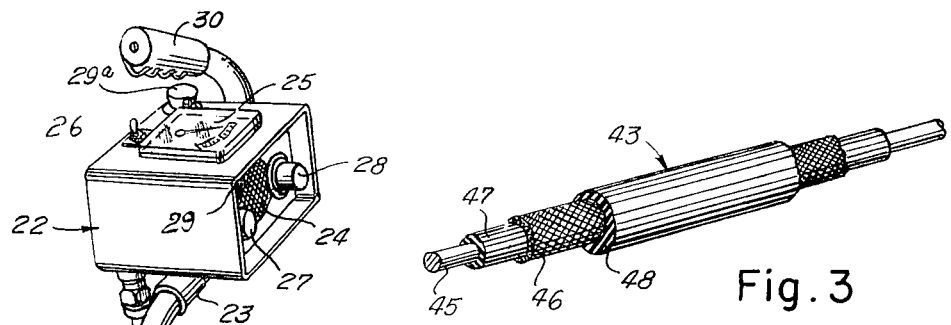
FIG. 3 is a fragmentary view, with some parts removed, of coaxial cable of which the coil of FIG. 2 is formed.

Referring now particularly to FIGS. 1 through 7 of the drawings, the detector 10 embodying the invention includes a probe assembly 11 pivotally mounted on a handle 12. The lower flat end portion 13 of the handle extends between the upright legs of a pair of brackets 14 and 15 and is pivotally secured thereto by means of a bolt 16 which extends through aligned apertures in the upright legs of the angle members and the end portion 13. The angle members are secured to a connector portion 18 of the probe assembly 11 by means of studs 19 whose lower ends are embedded in the connector portion and which extend upwardly through suitable apertures in the horizontal flanges of the angle members and secured thereto by nuts threaded thereon. A housing 22, mounted on the upper inclined portion 23 of the handle, houses a battery (not shown) for providing an electric current for the detector, a loudspeaker 24, a meter 25, a switch 26 for connecting the meter in the detector circuit, a rotatable control knob 27 for varying the amplitude of the sound being transmitted by the speaker, a second rotatable control knob 28 for varying the value of a variable capacitor to be discussed below, an on-off switch 29, and a rotatable probe assembly selector switch 29a.

The top end portion of the handle 12 may be curved forwardly and be provided with a hand grip 30.

It will be apparent that the probe assembly 11 may be pivotally adjusted to a position wherein it will extend parallel to the surface beneath which buried or concealed metal objects are to be sought.

The probe assembly 11 includes an outer inductor assembly 32 and an inner inductor assembly 33. The outer ends of the connector portion of the probe assembly are integral with the outer inductor assembly and the inner inductor assembly being integral with the connector portion 18 and the outer inductor assembly.

As will be explained in greater detail below, the connector portion 18 and an outer coating of the indicator assemblies 32 and 33 may be moulded as a single unit and be formed of fiber glass, and the like.

The outer inductor assembly 32 includes a coil 40 formed of several turns of a coaxial cable 43. In the present instance, the coil 40 is shown as having only two turns 41 and 42 for clarity of illustration. It will be apparent to those skilled in the art that such coil 40 may be formed of as many turns as desired or as is required for a particular application.

The coaxial cable includes a central or inner solid conductor 45, a cylindrical sheath conductor 46 coaxial with the conductor 45 formed of a woven conductive material, such as copper strands, and separated from and held in coaxial relation relative to the central conductor 45 by a cylindrical insulation 47. The cable 43 also includes an outer cylindrical coating or layer of insulation 48.

For reasons to be explained below, the cable 43 prior to its winding into the coil 40 has a small central section of the outer conductor 46 removed, by any suitable means, to divide it into two separate sections 51 and 52 of the outer conductor 46. The conductor 46 is easily divided into the two separate sections by cutting out a central section of the outer insulation coating 48 and of the outer conductor 46 to form the annualar external recess 53 in the conductor.

After the coaxial cable is wound into the coil 40, the turns 41 and 42 are secured to one another and held in circular form by a flexible insulation 49 wrapped about the turns. Such insulation may have an adhesive coating to hold it in place on the coil 40. The insulation is preferably overlapped so that during the molding process in which the outer casing 50 of the probe assembly is formed, the plastic material will not penetrate inwardly of the insulation layer 49.

The probe assembly 40 includes a Faraday shield 54 formed of aluminum foil or other suitable non-magnetic, preferably malleable, substance and is secured to the bottom portion of the coil and the insulation 49 in any suitable manner, either by an adhesive or bonding agent or by shaping the malleable foil to the outer configuration of the coil. As seen particularly in FIG. 4, the ends of the Faraday shield 54 are separated, as at 55.

The opposite or remote ends of the outer conductor sections 51 and 52 are connected to one another by the conductors 61 and 62 and to the ground conductor 63 of the power input circuit 64 of the detector circuit 66 (FIG. 7) which is suitably mounted in the housing 22. A conductor 68 which is connected to the midpoint of the Faraday shield 54 is also connected to the ground conductor. While in FIG. 7 the conductors 61 and 68 are separately connected to the ground conductor 63 for clarity of illustration, it will be apparent that the conductors 61, 62 and 68 and a conductor 69 which connects to one end of the central conductor 45 may be connected to a single insulated conductor 70 of multi-conductor cable 71. The opposite end of the central conductor 45 may be connected to another conductor 72 of the cable. The cable may be wound about the column 12 and led into the housing through a suitable fitting 74.

The indicator assembly 33 being identical to the inductor assembly 32 except for the dimension of its coil, its elements have been provided with the same reference characters, to which the subscript $a$ has been added, as the corresponding elements of the inductor assembly 32.

The inner conductors 45 and 45a of the conductor assemblies 32 and 33 are selectively connectable in the LC tank circuit of an oscillator 80 of the Colpitts type by means of the switch 29a. The oscillator 80 includes a transistor 81 whose emitter is connected to the positive voltage conductor 82 which is connected to the positive side of a direct current input circuit 64 when the switch 29 is moved to its closed position where it engages the stationary contact 83, by a conductor 85, a current limiting resistance 86, and a conductor 87.

The collector of the transistor 81 is connected by a conductor 88 to the switch 29a. The switch 29a when it is in the position illustrated in FIG. 7 engaging its stationary contact 89 is connected to one side of the conductor 45 of the coil 40 by the conductor 90 and the collector of the transistor is connected to the ground conductor 63 through the conductor 45 of the coil 40. When the switch is in its opposite position where it engages its other stationary contact 91, the collector of the transistor is connected to the ground conductor 63 through through the conductor 45a of the other small diameter inductor assembly 33.

The inductances of the two inductor assemblies 32 and 33 are equal so the frequency of the signal output of the oscillator 80 will be the same when the switch is in either of its two operative positions, i.e., if either the inductor assembly 32 or the inductor assembly 33 is connected in the LC tank circuit of the oscillator 80.

The frequency of the output of the oscillator 80 varies in accordance with the inductances of the coils formed by the conductor 45 or 45a of the coils 40 and 40a, respectively, while its normal value is determined by values of the capacitors 94, 95, and 96, as well as the value of the inductance of such coil 40 or 40a connected to form with such coil the LC tank circuit of the oscillator 80.

The capacitors 94 and 95 are connected in series between the ground conductor 63 and the collector of the transistor 81 by means of the conductors 98, 99, 100, and 87 while the variable capacitor 96, whose capacitance may be adjusted by the central knob 28, is connected between the ground conductor and the emitter of the transistor 81 by the conductors 103, 104, and 87.

The common connection 106 of the capacitors 94 and 95 is connected to the common connection 107 of the resistance 86 and the emitter of the transistor 81 by means of the conductor 109 which is connected to the conductors 85 and 99. The base of the transistor 81 is connected by a conductor 110 to the common connection 111 of a pair of resistances 112 and 113 which form a voltage divider and which are connected in series between the ground conductor 63 and the positive voltage conductor 82 by the conductors 115, 116, and 117.

The output of the oscillator 80 is transmitted to the input terminal 119 of a mixer circuit 120, the input terminal 119 of the mixer circuit being connected to the common connection of the resistance 86 of the collector of the transistor 81 by a conductor 121.

It will be apparent that for any given value of the variable capacitor 96, since the capacitors 94 and 95 have fixed values, the frequency of the output of the oscillator 80 will vary as the inductance of the coil of the inductor assembly 32 or 33 which is at that time connected by the switch 29a in the LC circuit of the oscillator 80.

The detector circuit 66 also includes any suitable stable reference frequency oscillator 125, for example, an oscillator the frequency of whose output is stabilized by a crystal, as is well known to those skilled in the art.

The reference frequency oscillator 125 is connected across the ground and positive conductors 63 and 82, respectively, by the conductors 126 and 127 while its output is transmitted by a conductor 128 to the other input terminal 129 of the mixer circuit 120. The mixer circuit is of any suitable type which, when the frequency of the output of the oscillator 80 varies from the frequency of the oscillator 125, provides a difference or beat frequency which is equal to the difference in the frequencies of the signals applied to its input terminals 129 and 119. For example, if the frequency of the output of the oscillator 80 is 30 cycles per second greater than the frequency of the output of the reference frequency oscillator, the mixer transmits a 30-cycle per second signal to the input terminal 132 of an audio amplifier and signal conditioning circuit 133. The gain of the circuit 133 may be varied by varying a suitable variable resistance of the audio amplifier circuit by rotation of the knob 27.

The power voltage, of course, is applied to the circuit 133 from the voltage input circuit 64 when the switch 29 is in its closed position, the audio amplifier being connected to the ground conductor 63 by the conductor 135 and to the positive voltage conductor 82 by the conductor 136. Biasing voltage is supplied to the audio amplifier by means of a conductor 138 which is connected to the common connection 111 of the resistances 112 and 133.

The audio amplifier produces an audio frequency signal which may be applied to the speaker 24, one side which is connected by the conductor 140 to the output circuit of the audio amplifier and whose other side is connected to the positive voltage conductor 82 by the conductor 141. The output of the circuit 133 may also be applied across the meter 25, when the switch 26 is in closed position, since the meter then is connected to the output circuit of the circuit 133 by the conductor 142 and to the positive voltage conductor 82 by the conductor 143.

It will be noted that the Faraday shield 54 does not form a closed conductive path due to the provision of the gap 55 therein and that it is connected to ground at the midpoint thereof remote from and directly opposite such gap in order that no unbalance in capacity effects be introduced into the inductor assembly. Similarly, the outer conductor 46 does not provide a closed conductive path since the outer central section of the outer conductor is removed to form the sections 51 and 52 of equal lengths and the ends of the sections 51 and 52 remote from the central gap are also connected to ground so that no unbalance in capacity effects is introduced thereby into the inductor assembly.

It would, of course, be possible to connect the ground conductor to the central section of the outer conductor instead of removing such central section in which case the opposite ends of the outer conductor would not be connected to one another or to any of the outer parts of the circuit.

Figure 7:
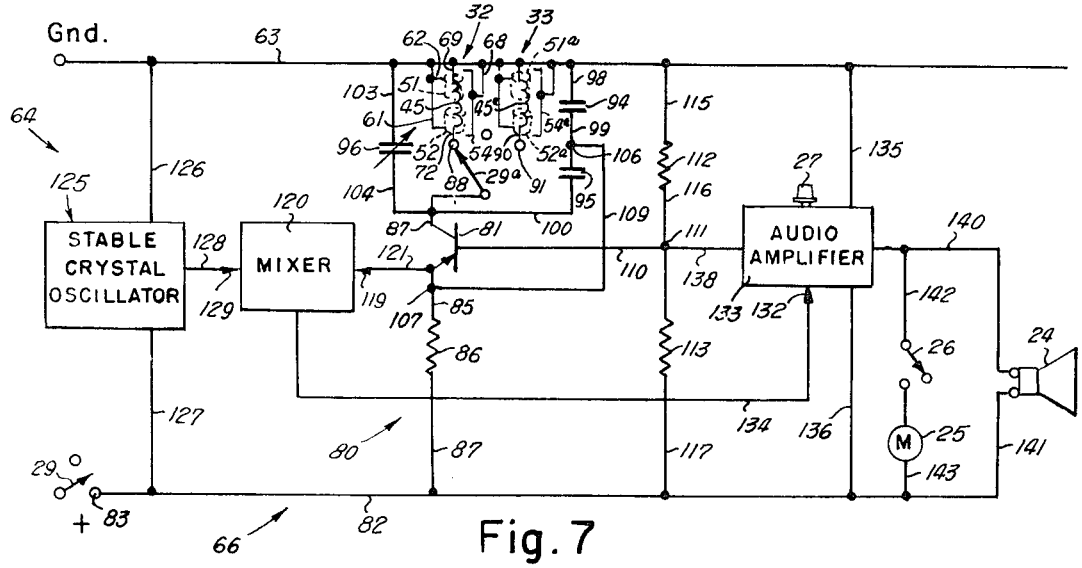
FIG. 7 is a diagramatic illustration of the electrical circuit of the detector.

In use, when it is desired to locate a metal object buried at a relatively great depth in the ground, the switch 29a is moved to the position illustrated in FIG. 7 to connect one end of the coil formed by the inner conductor 45 of the coil 40 in the LC tank circuit of the oscillator 80 since the electromagnetic field produced by the large diameter coil of the inductor assembly 32 will penetrate further into the ground than the electromagnetic field produced by the small diameter inductor assembly 33. The on-off switch 29 is then moved to its closed position, the probe assembly is moved to a position closely adjacent to the ground and parallel thereto and the variable capacitance 96 is adjusted by means of the knob 28 to cause the frequency of the output of oscillator 80 to be exactly equal to the frequency of the output of the reference oscillator 125. As a result, the mixer will not provide any such output which would be detected by the ear of the operator since it would cause an audible sound to be generated by the speaker each time a pulse is produced by the mixer circuit. Alternatively, the frequency of the output of the oscillator 80 may be made slightly different than the reference frequency so that a constant low frequency output is produced.

The operator then slowly moves the probe assembly parallel to the ground and thus "sweeps" a desired area of the ground. As the probe assembly moves into the proximity of a metal object or other conductive substance, such as iron or mineral, the magnetic field produced by the alternating current in the conductor 45 by the operation of the oscillator 80 is disturbed by such conductive metal object or substance and the inductance of the coil formed by the inner conductor 45 changes. Such change in the effective inductance of the conductor 45 connected in the LC tank circuit of the oscillator 80 causes a corresponding change in the output of the oscillator 80 which now becomes either greater or smaller depending upon the particular characteristics of the buried object, such as its size. As a result, the frequency of the output of the oscillator 80 now becomes different from the frequency of the output of the reference oscillator and the mixer provides an output signal to the audio amplifier whose frequency varies in accordance with the difference between these frequencies. This change in iductance becomes greater as the inductor assembly 32 moves directly over such buried object and becomes greatest when the inductor coil is exactly centered over the buried object and the object is located at the central axis of the inductor assembly 32. The operator then knows exactly where to dig to uncover the object.

Should it be desired to search for small or large objects which are not buried to any great depth below the surface of the ground, for example, not more than 2½ feet below the surface of the ground, the switch 29a is moved to its other opposite position where it connects the collector of the transistor 81 to the end of the inner conductor 45a of the inner assembly 33. The magnetic field produced by the small diameter inductor assembly penetrates less deeply into the earth, but is of greater intensity and therefore can detect smaller objects than the less intense, but more deeply penetrating magnetic field produced by the large diameter inductor assembly 30.

During the movement of the probe over the surface of the earth, as the operator sweeps a given area, the inductor assembly may be moved from direct sunlight into shadows thus causing the temperature to which the inductor assemblies are subjected to vary considerably. Such changes in the temperature, however, will not cause any appreciable change in the effective inductance of either of the inductor assemblies 32 or 33 for the reasons explained above and the operator does not therefore have to adjust the capacitance 96 each time the inductor assemblies are subjected to temperature changes as would be the case with conventional detectors.

Figure 9:
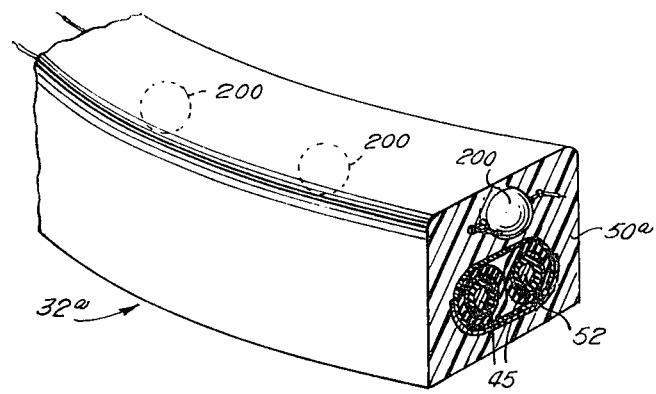
Figure 8:
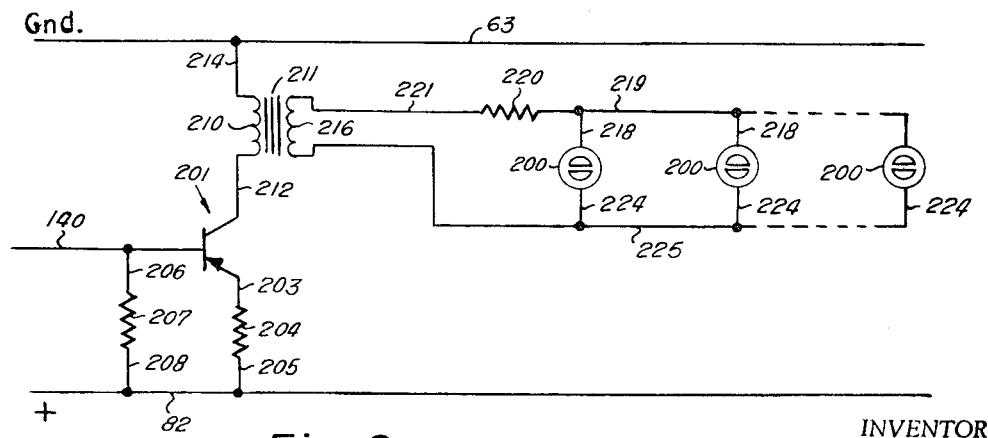
FIG. 8 is a diagramatic illustration of a modified form of the electric circuit of the detector; and, FIG. 9 is a fragmentary perspective view of a modified form of the inductor assembly embodying the invention.

Referring now particularly to FIGS. 8 and 9, the modified form of the inductor assembly 32a is substantially similar to the conductor assembly 32 and, accordingly, its elements have been provided with the same reference numberals, to which the transcript a has been added, as the corresponding elements of the conductor assembly 32. The indicator assembly 32a differs from the inductor assembly 32 only in that a plurality of neon bulbs 200 are embedded in the translucent casing 50a. The neon bulbs provide a visual indication of the frequency of output of the mixer 120 and will flash or glow each time a voltage pulse is applied thereacross.

Figure 2:
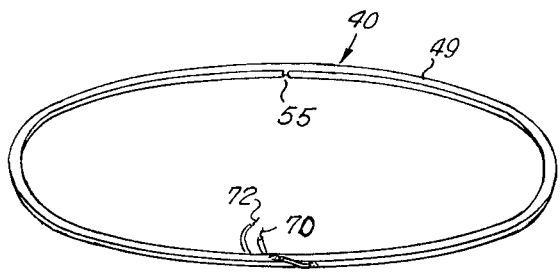
FIG. 2 is an exploded view of an inductor coil of an inductor assembly of the detector.
Figure 4:
FIG. 4 is a perspective view of a conductor assembly which includes the coil of FIG. 2 and a Faraday shield mounted on the coil.
Figure 5:
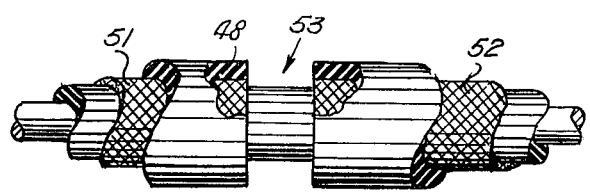
FIG. 5 is an enlarged view, with some portions broken away, showing the manner in which the outer conductor of the cable of which the coil is formed into two sections of equal lengths.
Figure 6:
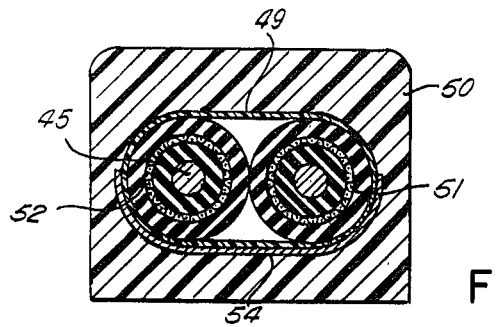
FIG. 6 is an enlarged sectional view taken on line 6—6 of FIG. 1.

As illustrated in FIG. 2, in order that the output of the audio amplifier 133 be of such voltage and current as to cause the lamps 200 to flash or glow each time a pulse is delivered by the audio amplifier, the output of the audio amplifier is applied to the base of an amplifier transistor 201 whose emitter is connected to the positive voltage conductor 82 through the conductor 203, a resistance 204 and a conductor 205. A biasing potential is also supplied to the base of the transistor, it being connected to the positive voltage conductor 82 through the conductors 140 and 206, a resistance 207 and a conductor 208.

The collector circuit of the amplifier transistor 201 is connected in series with the primary winding 210 of a transformer 211, the collector of the transistor 201 being connected to one side of the primary winding 210 by the conductor 63 by a conductor 214. The bulbs 200 are connected to one side of the secondary winding 216 of the transformer 211 by the conductors 218, a conductor 219, a resistance 220, and the conductor 221 and to the other side of the secondary winding by the conductors 224 and a conductor 225.

It will now be apparent that the transistor 201 acts as an amplifier for the output of the audio amplifier and the transformer 211 acts as a voltage step up transformer to raise the voltage of the output signal of the amplified output of the audio amplifier 133 to a value sufficiently high to cause the lamps to flash each time the audio amplifier provides an output pulse.

The conductor assembly 32a is used in metal detectors which are used under water to discover objects buried or in the ground below the surface of a body of water or lying thereon and covered by plants and the like. In the use of such detectors under water it is vitally important for the operator to continuously observe the area of the surface of the earth near and within the circular conductor assembly 32a. The operator therefore cannot use such detector as effectively if he must keep his eyes upon a meter rather than upon the ground being search. The use of the earphone as a speaker also is not very satisfactory because of extraneous noises in the water and the fact that the cable which leads from the earphone to the housing of the detector causes great inconvenience and may foul upon other objects or on the body of the operator himself. The provision of the neon bulbs in the upper portion of the oscillator assembly 32a enables the operator to constantly and continuously observe the surface near and within the area directly below the circle of the conductor assembly 32 a. The flashing of the bulbs which increases the frequency as the conductor assembly is moved over the location of a metal object is readily perceived by the operator even though he continues at all times to observe and inspect the surface of the earth located directly below the inductor assembly 32.

The indicator assembly 32a could, of course, not be mounted on a long handle, but on a small dimension housing held directly by the operator. The neon bulbs could, of course, be mounted on such housing if desired.

It will be seen that the metal detectors embodying the invention may be used not only to discover and locate metal objects buried in the earth, but also to discover objects which may be embedded in walls of building structures and the like.

It will now be seen that a new and improved metal detector for locating concealed metal objects has been illustrated and described which has two inductor assemblies, one of small diameter and the other of large diameter, which provide electromagnetic fields of different intensities and areas so that the detector may be used effectively to locate relatively large objects buried relatively deep in the earth and small and large objects buried at a relatively small depth in the ground.

It will further be seen that each inductor assembly is formed of a coaxial cable whose outer conductor prevents stray variations in the capacitance introduced by the Faraday shield of the assembly or variations in the inductance introduced by changes in the diameter of the coil or the spacing of the turns of the coil caused by temperature variations from varying the effective inductance of the inductor assembly and thus the operation of the detector is facilitated by minimizing or eliminating the necessity for adjusting the normal frequency of oscillation of the oscillator 80 upon occurrence of temperature changes.

It will also be seen that the spacing between the inner and outer conductors 45 and 46, respectively, of the coil 40 is held constant at all times by the inner layer of insulation so that changes in temperature do not introduce capacity changes into the conductor assembly due to spacing changes between the inner and outer conductors.

It will also be seen that the inner conductor and the Faraday shield form open electrical paths so that the inner conductor and the Faraday shield are connected to ground at the midpoints of the electric paths.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A circular inductor assembly for a metal detector including: a coaxial cable having an inner control conductor, an outer conductor coaxial with and about said inner conductor, insulation means between said inner and outer conductors and about said outer conductor, said cable being disposed in a circular coil having a plurality of turns; a conductive shield disposed about the bottom portion of said coil; casing means about and enclosing said coil and said shield; and means for connecting one end of said inner conductor, said outer conductor and said shield to an electric ground and for connecting the other end of said inner conductor to an electric circuit.

2. The inductor assembly of claim 1, wherein said outer conductor and said shield constitute open electric paths, said connecting means being connected to said outer conductor and said shield at the midpoints of said electric paths.

3. The inductor assembly of claim 1, wherein said outer conductor comprises a pair of sections of equal lengths, adjacent ends of said sections being spaced from one another, said means for connecting said outer conductor to an electric ground being connected to the ends of said sections remote from said adjacent ends.

4. The assembly of claim 3, wherein said shield constitutes an open electric path, said connecting means being connected to said shield at the midpoint of its electric path.

5. The inductor assembly of claim 1, and a plurality of electric light means mounted adjacent said inductor assembly, and means for connecting said light means to an input circuit for causing said light means to flash in accordance with the frequency of the voltage of said input circuit.

6. A detector including: a first oscillator means for providing an output having a stable reference frequency; a second oscillator having a frequency determining circuit for varying the frequency of the output of said second oscillator; comparator means operatively associated with said oscillators for providing an output signal whose frequency varies in accordance with the difference between the frequencies of the outputs of said oscillator; and a circular inductor assembly comprising a coaxial cable having an inner central conductor, an outer conductor coaxial with and about said inner conductor, and insulation means between said inner and outer conductors and about said outer conductor, said cable being disposed in a circular coil having a plurality of turns; a conductive shield disposed about the bottom portion of said coil; casing means about and enclosing said coil and said shield; means for connecting one end of said inner conductor, said outer conductor and said shield to an electric ground of said second oscillator, and means for connecting the other end of said inner conductor to said frequency determining circuit of said second oscillator, the frequency of the output of said second oscillator varying in accordance with the effective inductance of said inductor assembly.

7. The detector of claim 6, wherein said outer conductor and said shield constitute open electric paths, said connecting means being connected to said outer conductor and said shield at the midpoints of said electric paths.

8. The detector of claim 7, and indicator means responsive to the output of said comparator means for providing a signal which varies in accordance with the frequency of the output of said means.

9. The detector of claim 8 wherein said indicator means comprise electric light means which flash in accordance with the frequency of the output of said comparator means.

10. A metal detector including: first and second circular inductor assemblies of different diameters and lying in a common plane, each inductor assembly comprising a coaxial cable having an inner conductor, an outer conductor coaxial with and about said inner conductor, insulation means between said inner and said outer conductors and about said outer conductors, said cable being disposed in a circular coil having a plurality of turns, and a conductive shield disposed about the bottom portion of said coil; casing means about and enclosing said coils and said shields of said inductor assemblies; a first oscillator having an output of a stable reference frequency; a second oscillator having a frequency determining circuit; means for selectively connecting one end of said inner conductor of each of said inductor assemblies to said frequency determining circuit, the frequency of the output of said second oscillator varying in accordance with the effective impedance of the inductor assembly whose inner conductor is connected to said frequency determining circuit; and comparing means operatively associated with said oscillators for providing an electric output signal which varies in accordance with the difference in the frequencies of the outputs of said oscillators.

11. The metal detector of claim 10 wherein one of said inductor assemblies is disposed within the other of said inductor assemblies.

12. The metal detector of claim 11 and indicating means operatively associated with said comparator means for providing a signal perceivable by an operator of the detector which varies in accordance with the frequency of the output of said comparator means.

* * * * *